(12) United States Patent
Kammler et al.

(10) Patent No.: US 7,299,604 B2
(45) Date of Patent: Nov. 27, 2007

(54) METHOD AND APPARATUS FOR MOVING A WELDING JAW

(75) Inventors: Roman Kammler, Worms (DE); Walter Baur, Gruendau (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 11 days.

(21) Appl. No.: 11/237,242

(22) Filed: Sep. 28, 2005

(65) Prior Publication Data

US 2006/0064945 A1 Mar. 30, 2006

(30) Foreign Application Priority Data

Sep. 29, 2004 (DE) .................. 10 2004 047 207

(51) Int. Cl.
*B65B 9/08* (2006.01)
*B65B 51/10* (2006.01)

(52) U.S. Cl. .................... 53/451; 53/551; 53/374.5

(58) Field of Classification Search .............. 53/451, 53/452, 52, 551, 374.5, 450, 550, 552, 75, 53/373.7, 674.08; 156/580, 583.1
See application file for complete search history.

(56) References Cited

U.S. PATENT DOCUMENTS

| 3,665,673 | A | * | 5/1972 | Billett et al. .................. 53/441 |
| 4,825,625 | A | * | 5/1989 | Hufford ........................ 53/451 |
| 4,829,752 | A | * | 5/1989 | Focke et al. ................ 53/371.9 |
| 5,063,727 | A | * | 11/1991 | Patelli .......................... 53/552 |
| 5,347,795 | A | * | 9/1994 | Fukuda ......................... 53/552 |
| 5,540,802 | A | * | 7/1996 | Totani ......................... 156/359 |
| 5,822,949 | A | * | 10/1998 | Naoi ............................. 53/55 |
| 5,860,270 | A | * | 1/1999 | Gerwe ......................... 53/477 |
| 6,044,628 | A | * | 4/2000 | Katayama et al. ............ 53/552 |
| 6,427,425 | B1 | * | 8/2002 | Nakagawa et al. ........... 53/551 |
| 7,000,366 | B2 | * | 2/2006 | Borghi et al. ................. 53/451 |

FOREIGN PATENT DOCUMENTS

DE 44 25 207 A1 1/1996

* cited by examiner

*Primary Examiner*—Rinaldi I. Rada
*Assistant Examiner*—Paul Durand
(74) *Attorney, Agent, or Firm*—Flynn, Thiel, Boutell & Tanis, P.C.

(57) ABSTRACT

To be able to weld different items, in particular films of different thickness and composition, in an optimized way in each case, it is proposed in the case of a welding jaw circulating along a closed path, for example a transverse welding jaw of a vertical tubular bag machine, to provide a sealing time factor (Kt) that can be set as desired within an open interval from zero to one and is equal to a quotient of a sealing time (ts) and a cycle time (tz) for a circulation of the welding jaw.

12 Claims, 8 Drawing Sheets

METHOD AND APPARATUS FOR MOVING A WELDING JAW

CROSS-REFERENCE TO RELATED APPLICATIONS

This application claims the benefit of German Application Ser. No. 10 2004 047 207.6, filed Sep. 29, 2004, which is incorporated herein in its entirety.

FIELD OF THE INVENTION

The proposed innovation relates to packaging machine construction and in respect thereof to a method for moving a welding jaw, in particular a welding jaw of a transverse sealing station of a vertical tubular bag machine, and also to a vertical tubular bag machine operated in this way.

BACKGROUND OF THE INVENTION

It is known from DE 44 25 207 A to move a welding jaw of a transverse sealing station of a vertical tubular bag machine along a closed path. In this case, the path has a straight portion, which is provided for making contact with a film tube pressed together between the welding jaw and a second, oppositely running welding jaw. In this case, the film tube and the welding jaw are moved further at the same speed in the direction of the straight portion, in order to weld the film tube by exposure to the heat of the welding jaws within a sealing time. Two drives, acting in directions perpendicular to each other and moving the welding jaw, serve for producing a circulating movement of the welding jaw, a complete jaw circulation being achieved within a cycle time.

The known method has the disadvantage that, for a specific bag length, it is always definitively prescribed what percentage of the cycle time, i.e. the time for a 360° circulation of the welding jaw, is available for the time in which the sealing takes place. This sealing time, which generally comprises the period of time during which the welding jaw is in contact with the film tube, that is to say is welding it, is sometimes also defined for mechanical engineering reasons in such a way that it comprises both the period of time during which the welding jaw is positioned at a slight distance away from the film tube, in order to preheat it or cool it by means of cooling air (after welding has taken place), and the period of time of pressing the welding jaw onto the film tube along an effective sealing path (Zseff).

Since the percentage of the cycle time intended for the sealing time (however it is defined) is always constant, bags of any length are welded with a fixed percentage, which is referred to as the sealing time factor. Similarly, film types are always welded with a specific sealing time factor, irrespective of their thickness and their structure (layers, types of plastic, layer thicknesses). The sealing time factor is in this case kept constant in the same way, irrespective of a preselected bag length, since in the known prior art coupling elements between two drives acting perpendicularly to each other provide for this.

Also, in the case of the known methods, the sealing time factor is kept constant for a constant bag length if there is a change of film type. This has the disadvantage that different film types are welded with different quality, in particular at relatively high output. Certain film types which are subjected to the constant percentage of the cycle time as a sealing time at high output, i.e. with a low cycle time, are no longer reliably welded if they in fact require a relatively great amount of heat to be introduced as a result of their great thickness or their multilayered construction. Although this can be technically remedied in terms of the gearing by using a different coupling or cranking technique, if it is subsequently intended again to weld a film type that requires a smaller amount of heat to be introduced or a shorter bag length is to be produced, the inflexible, greater sealing time factor has the effect that the packaging output is reduced, since too much sealing time is provided, which then prolongs the cycle time. The longer the cycle time is, the fewer welding operations can be carried out per minute. For a cycle time of 1 sec, 60 tubular bags per minute are transversely welded, and consequently produced, on a vertical tubular bag machine.

SUMMARY OF THE INVENTION

The invention is based on the object of being able to weld any desired films with greater output and quality.

The object is achieved according to the claims. According to this, a sealing time factor Kt that can be set as desired for different bag lengths is preferably predetermined for each bag length, is a value in an open interval between zero and one, preferably between 0.1 and 0.8, which describes which time fraction is provided as a percentage of the cycle time tz Zseff for the sealing time along an effective sealing path tz Zseff, and is formed by the equation $Kt=ts/tz$. In this case, the drives are operated in such a way that the sealing time factor Kt is maintained.

The proposed method has the advantage that, for a specific bag length, the sealing time factor is set as desired, i.e. to a suitable or optimum value, depending on the film type or depending on the quality requirement for the sealing seam. This can be performed for example by keying in on a display of a packaging machine. If a value which is slightly above zero is entered (lowest extreme case), only a very brief application of the welding jaws to a film tube takes place, while considerable time is available for returning the welding jaw to carry out a subsequent welding operation. This produces a maximum packaging output for example for the case in which an extremely thin, quick-to-weld film of a film tube is welded transversely to its transporting direction, and very short bags are produced. If, on the other hand, a value which is slightly below one is preselected, the available sealing time is almost as great as the cycle time. Considerable time is available for example to reliably weld a particularly thick film, comprising many different layers, transversely to the film transporting direction. The remaining, comparatively small period of time to the completion of a cycle is then still adequate to return the welding jaw to the beginning of the sealing path, even in the case of very long bags.

Very high Kt values, for example $Kt=0.8$, can also be achieved for short bags. If, for short bags, a low film transporting speed is chosen, a long sealing time is in this case possible.

Corresponding activation of the drives provides for this to be implemented. Under actual conditions, values of 0.1 to 0.8 for the sealing time factor are suitable to achieve the maximum machine output. The ideal sealing time factor respectively for a film type and a specific bag length on a specific packaging machine may be provided, for example, in the form of a table and be entered in a machine control system before a new packaging process. Or this control system contains all the necessary data in tabular form, and retrieves it if only the film type to be processed and the desired bag length are entered.

Further, advantageous refinements of the proposed method are described in the claims.

The method is particularly suitable for operating a vertical tubular bag machine, the welding jaw welding a film tube by means of transverse seams, and in each case a tubular bag with a specific bag length being severed from the film tube by means of a cutting device.

A particularly great increase in the machine output (bags per minute) is achieved if, for a given effective, i.e. actual, sealing path Zseff, with increasing bag length a decreasing sealing time factor is provided. In an ideal way, the functional relationship between the bag length (x axis) and the sealing time factor (y axis) in this case describes a hyperbole, at least in a partial interval of the range from zero to one. If for a given bag length and a given effective sealing path (Zseff), a sealing time factor is selected, for example from a table, or by a computer unit on a packaging machine, a maximum machine output can be correspondingly achieved.

In many cases, customary practice is followed if the effective sealing path (Zseff) is part of a mechanical engineering sealing path (Zs), and the sealing path (Zs) is made up of a preheating section (Zv) or a stripping section (stripping path) known per se for preheating or stripping (by means of a stripping device) the item with the welding jaw at a distance from the item, the actual, effective sealing path (Zseff) and optionally a cooling section (Zk) for cooling the item with the welding jaw at a distance from the item, during which cooling air is blown onto the item from a cooling air outlet provided at the welding jaw. For the proposed method, it is immaterial how precisely the sealing path is defined. In any event, a sealing time which is made available for the sealing path is used for carrying out the welding. Whether part of the sealing path is used for film preheating and, if appropriate, a further section of the sealing path is used for seam cooling, is immaterial in process engineering terms for the remaining cycle time that is left for returning the welding jaw. Altogether, however, if the mechanical engineering sealing path is used instead of the effective sealing path, the sealing time factors become greater (but never equal to one), and the sealing time should then be defined as the time for the mechanical engineering sealing path. In an analogous way, a so-called automatic sealing time (for a constant film speed) or a so-called manual sealing time (manually tested film compression) can also be incorporated in the sealing time factor.

BRIEF DESCRIPTION OF THE DRAWINGS

The proposed method and a vertical tubular bag machine that can be operated by the proposed method are described in more detail below on the basis of figures representing exemplary embodiments, in which.

DETAILED DESCRIPTIONS OF THE INVENTION

Figure 1:
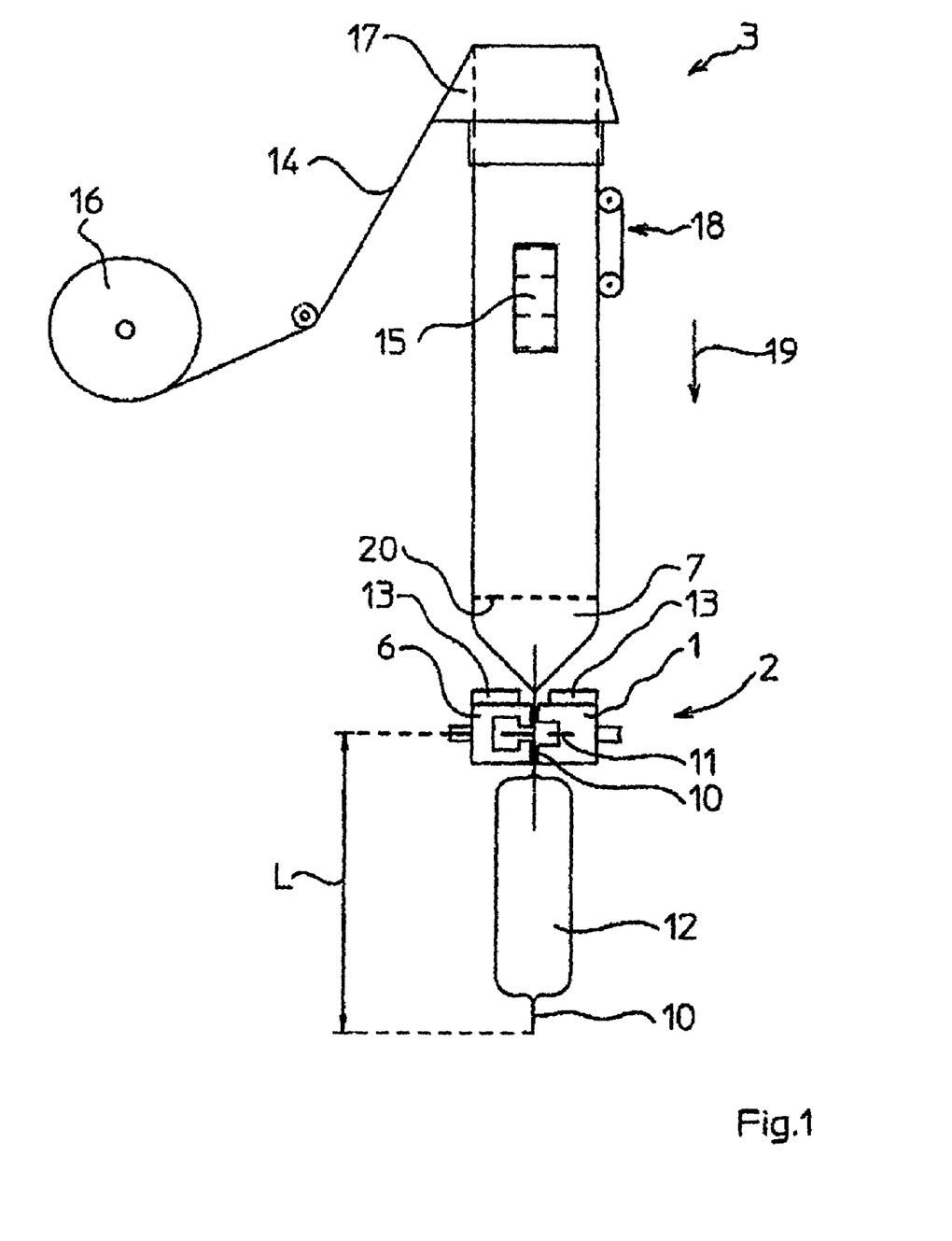
FIG. 1 shows a side view of a vertical tubular bag machine with welding jaws of a transverse sealing station that can be moved toward each other.

In the case of a vertical tubular bag machine 3, a film web 14 is drawn off from a supply roll 16 by means of a takeoff 15, drawn over a shaping shoulder 17 and thereby shaped into a film tube 7 (FIG. 1). The film tube 7 is welded in the transporting direction 19 by means of a longitudinal sealing device 18 and filled by a filling pipe 20. Two circulating welding jaws 1, 6, which can be moved toward each other, serve the purpose of welding the film tube 7 transversely to the transporting direction 19 by means of transverse seams 10. A cutting device 11 in one welding jaw 1 serves the purpose of in each case severing a tubular bag 12 with a specific bag length L from the film tube 7.

Figure 3:
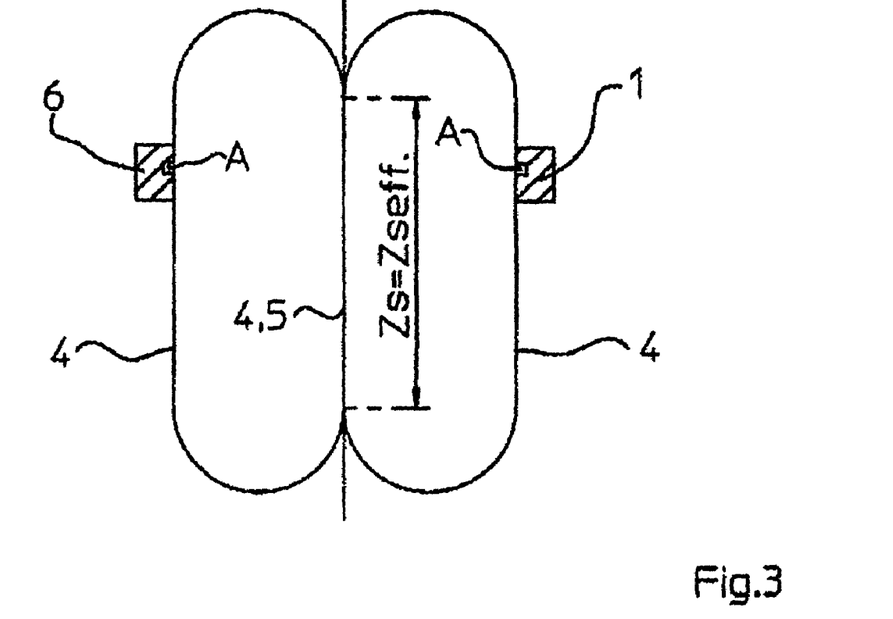
FIG. 3 shows a schematic representation of the circulation of two welding jaws, which can be moved toward each other and weld the film tube of FIG. 1 along an effective sealing path Zseff.

The welding jaws 1, 6 are operated in such a way that they circulate in opposite directions, in order to carry out the welding of the film tube 7, which is moved downward at the same speed as the welding jaws 1, 6, along an effective sealing path Zseff (FIG. 3). For this purpose, both welding jaws 1, 6 are moved in each case with a point of movement A along a closed path 4. Each path 4 has a straight portion 5, which is provided for making contact with the film tube 7 pressed together between the welding jaws 1, 6. In this case, the film tube 7 and the welding jaw 1 are moved further at a constant speed in the direction of the straight portion 5, in order to weld the film tube 7 by exposure to the heat of the welding jaws 1, 6 within a sealing time ts.

Figure 2:
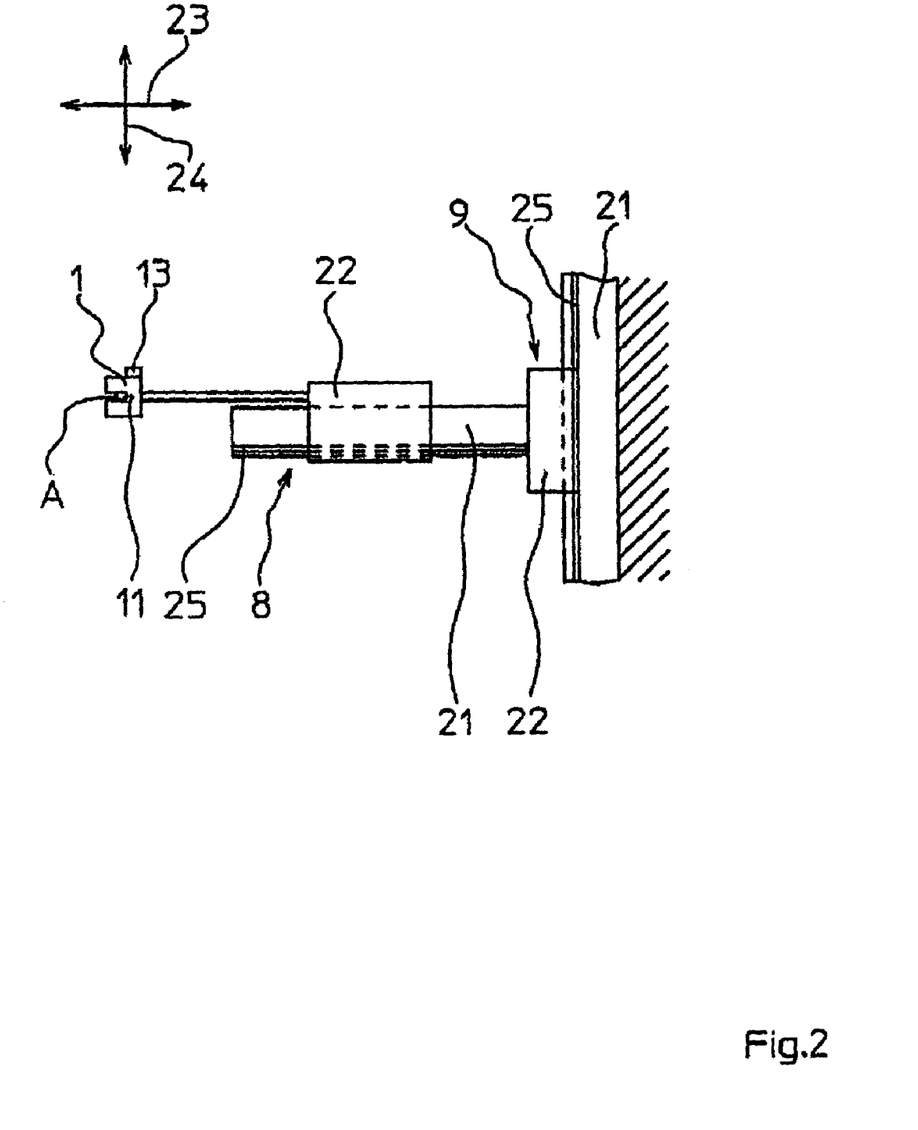
FIG. 2 shows a side view of two drives, acting perpendicularly to each other, for moving a point A of one welding jaw of FIG. 1 along a circulating path.

Two drives 8, 9, which are designed as linear drives with in each case a driving part 21 and a moving part 22, act in directions 23, 24 that are perpendicular to each other and move a welding jaw 1, are provided to achieve a circulation of the welding jaw 1 within a cycle time tz. The second welding jaw 6 is moved in a way analogous to this.

Figure 4:
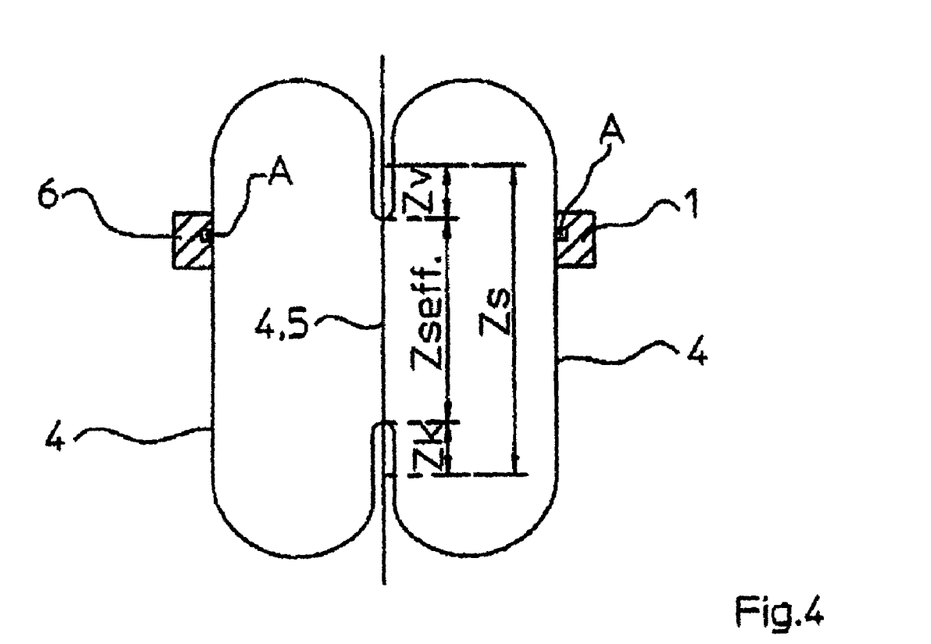
FIG. 4 shows a schematic representation of the welding jaw circulation corresponding to FIG. 3, but with an effective sealing path reduced by a preheating section and a cooling section.
Figure 5:
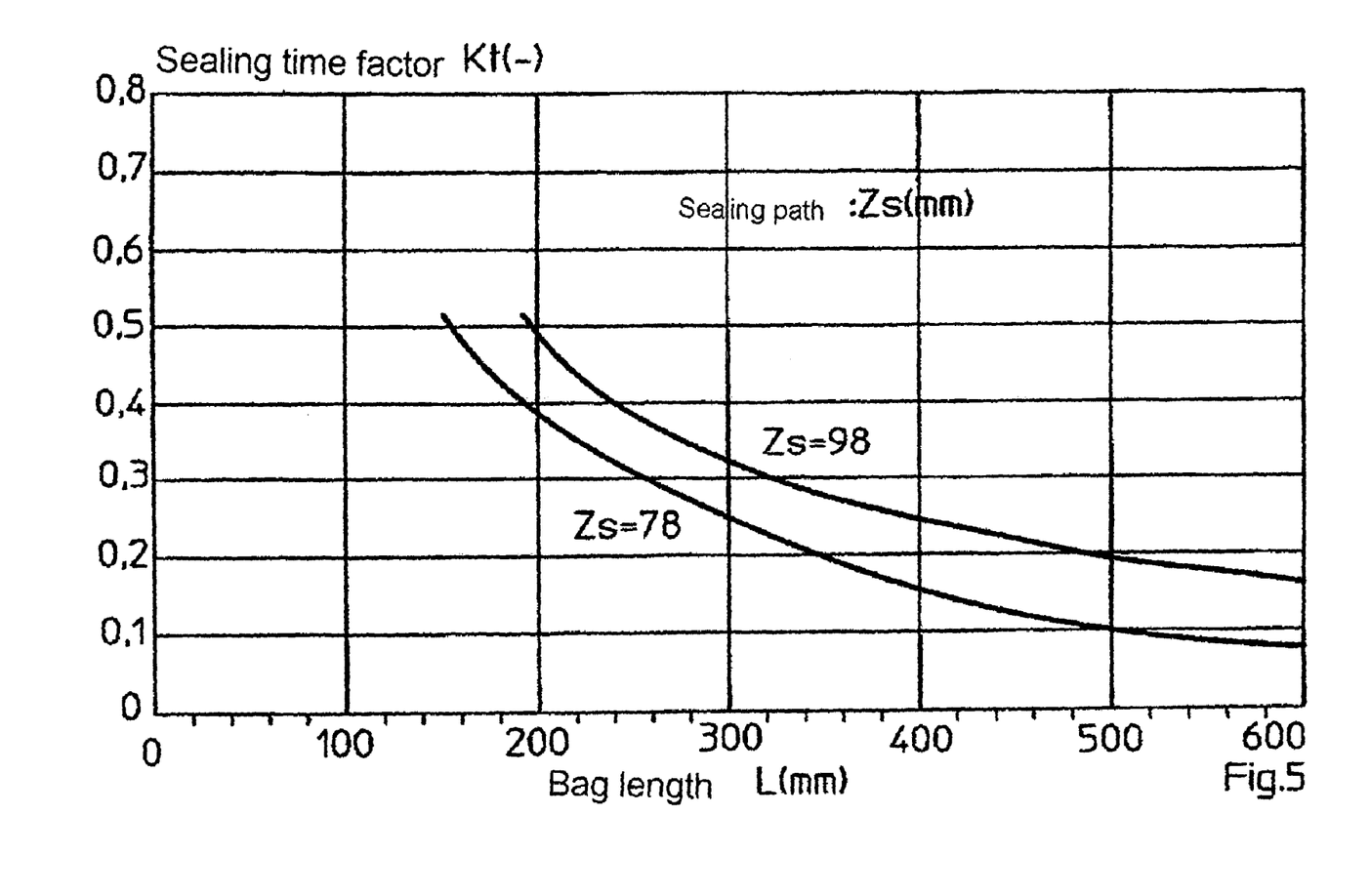
FIG. 5 shows a diagram of the functional relationship between a sealing time factor, which can be chosen as desired within an interval, and a bag length, in the case of two different sealing paths, which is state of the art and can be realized with the proposed method.

Before the tubular bag machine 3 is operated, a sealing time factor Kt, which can be set as desired and is a value in an open interval between zero and one, preferably between 0.1 and 0.8, is entered in a display of the machine. This describes which time fraction is provided as a percentage of the cycle time tz for the sealing time ts along the effective sealing path Zseff. It is formed by the equation Kt=ts/tz. Then, the drives 8, 9 are operated on the basis of stored values in such a way that the sealing time factor Kt is maintained. A sealing path Zs of 78 mm or a sealing path Zs of 98 mm may be prescribed as the stored value (FIG. 5). On the basis of a specific film type to be processed for a sealing path Zs of 78 mm, the sealing time factor Kt is selected as 0.5. Consequently, relatively short bags, the length L of which is intended to be 180 mm, can be produced much more quickly than in the case of a conventional tubular bag machine, the sealing time factor Kt of which has a value of 0.3 for all bag lengths L. If relatively long tubular bags 12 with a bag length L of 500 mm are to be produced, and a section of 98 mm is provided as the sealing path Zs, a sealing time factor Kt of 0.2 is set. In comparison with a known technique, in which Kt=0.3, time is then gained for the return of the welding jaws 1, 6 for a new transverse welding operation on the film tube 7. On the other hand, the time for return was comparatively low in the case of the short tubular bag 12. In both cases (short and long tubular bags 12), an increase in output of the tubular bag machine 3 was achieved. In the first case (short bag) because of a shortening of the return time along the bent portion of the path 4 and in the second case (long bag) because of a lengthening of this portion, though in fact because of a sealing time factor Kt prescribed for the bag length L. An optimum output (bags per minute) is achieved if the tubular bag machine 3 is always operated in such a way that, for a given effective sealing path Zseff, with increasing bag length L a decreasing sealing time factor Kt is provided. Otherwise, the return operation would generally not take place quickly enough, and consequently there would be a time loss (loss of output). While in the case of this exemplary embodiment, for a given bag length L and a given effective sealing path Zseff, a sealing time factor Kt is selected (FIG. 4), the effective sealing path Zseff may also be part of a mechanical engineering sealing path Zs (FIG. 5). Then the sealing path Zs is made up of a preheating section Zv for preheating the film tube 7 with the welding jaws 1, 6 at a distance from the film tube 7, the actual, effective sealing path Zseff and optionally a cooling section Zk for cooling the film tube 7 with the welding jaws 1, 6 at a distance from the film tube 7, during which cooling air is blown onto the film tube 7 from a cooling air outlet 13 respectively provided at the welding jaws 1, 6. In this case the sealing time ts is defined as the time for the mechanical engineering sealing path Zs.

Figure 6:
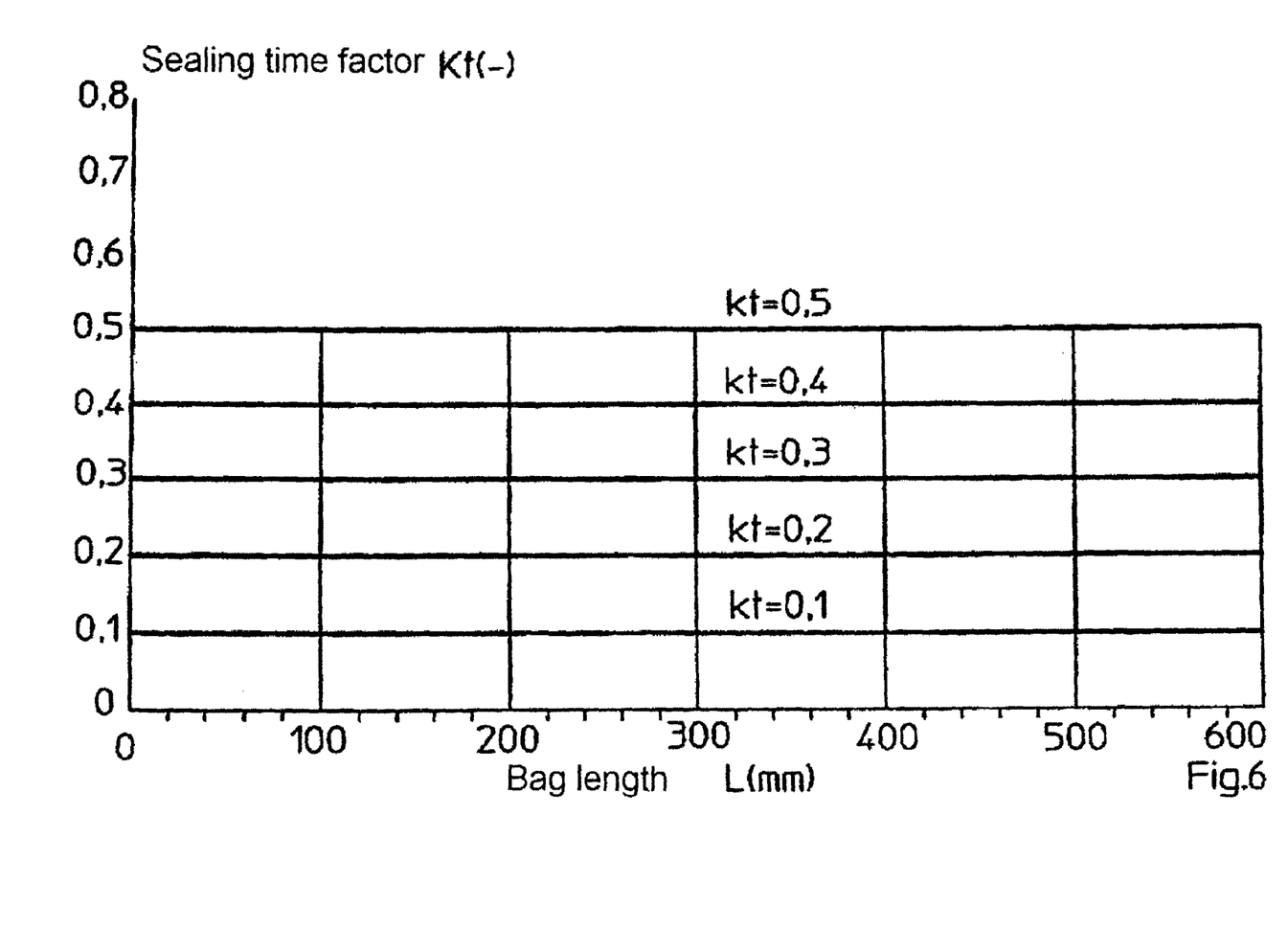
FIG. 6 shows a diagram of a functional relationship between bag lengths and sealing time factors according to the proposed method.
Figure 7:
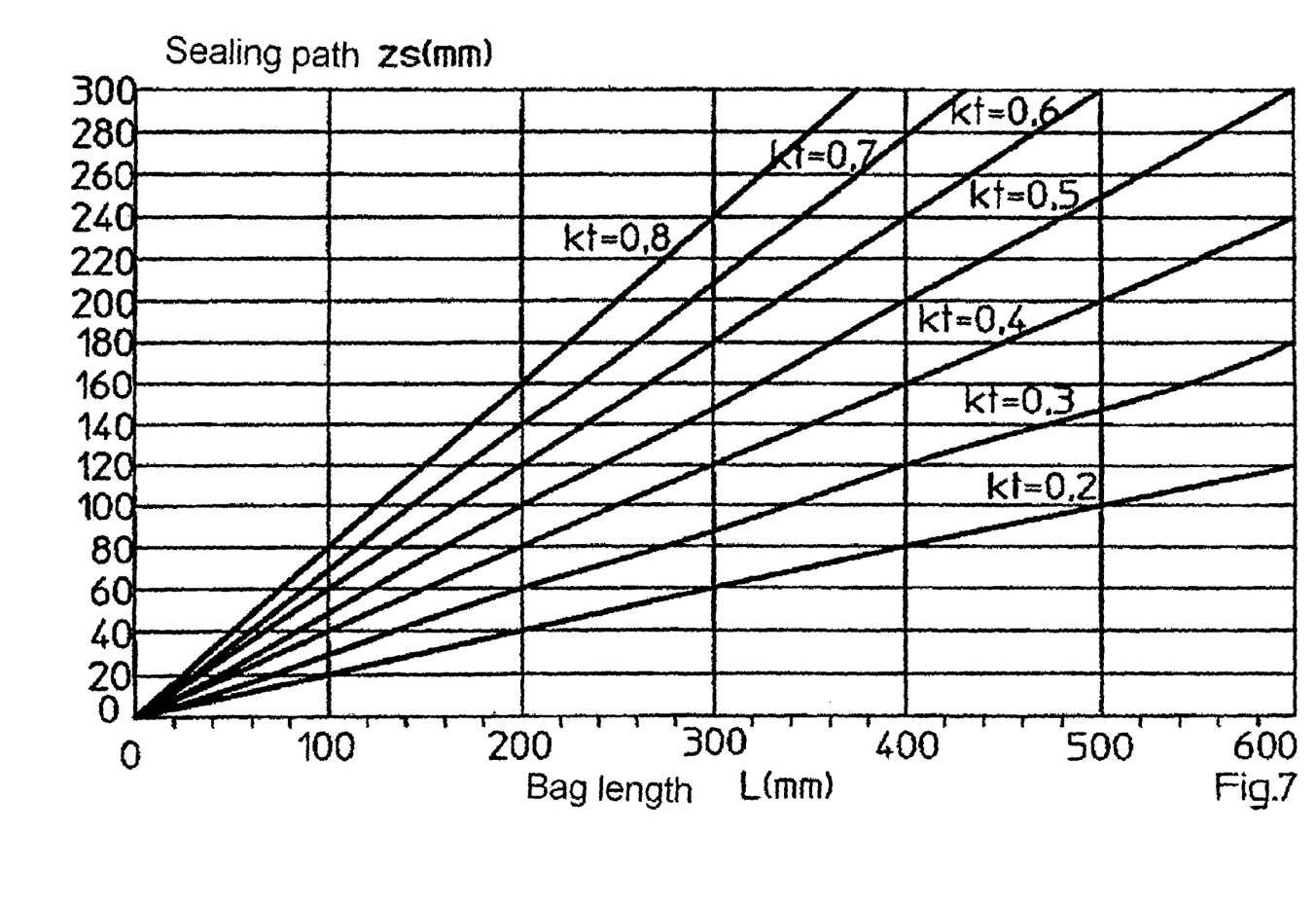
FIG. 7 shows a diagram of a functional relationship between bag lengths and sealing paths for selectable Kt values according to the proposed method.

With the method according to the invention, a constant sealing time factor Kt can be preselected independently of the bag length L (FIG. 6). Moreover, relatively high sealing time factors Kt can be achieved. The higher the Kt value (FIG. 7), the longer the sealing paths Zs available. For example, given a bag length L of 300 mm, instead of a Kt value of 0.35 (the maximum achieved in the case of the known prior art), the Kt value can be increased to 0.8. As a result, instead of a sealing path Zs of about 110 mm, a much higher sealing path Zs of 240 mm is available.

The two drives 8, 9 are electromagnetic linear drives. They operate as linear motors. Their movable parts 22 hover along the driving parts 21 on the principle of magnetic levitation. In this case, a moving part 22 of a drive 8, 9 is respectively guided along a guide 25 of the driving part 22 of the drive 8, 9. By superposing the movements of the drives 8, 9, which are moved in directions 23, 24 perpendicular to each other, all the positions of the point of movement A on the closed path 4 can be produced. Similarly, the path 4 can be correspondingly modified.

Figure 8:
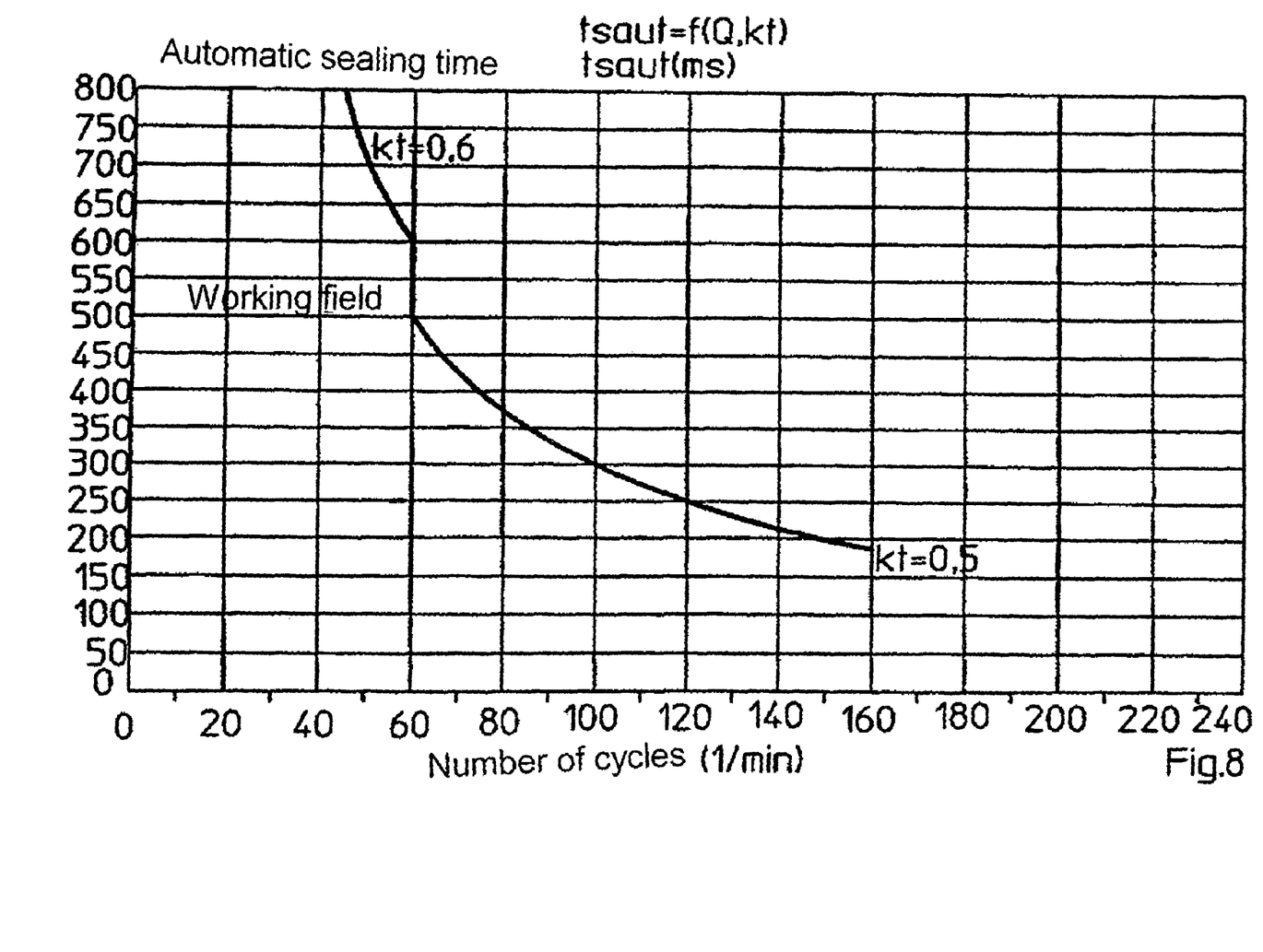
FIG. 8 shows a diagram of a functional relationship between a cycle time (bags per minute) and an automatic sealing time for two different Kt values, a working field for operating a vertical tubular bag machine being defined between the x axis, the y axis and the Kt graphs.
Figure 9:
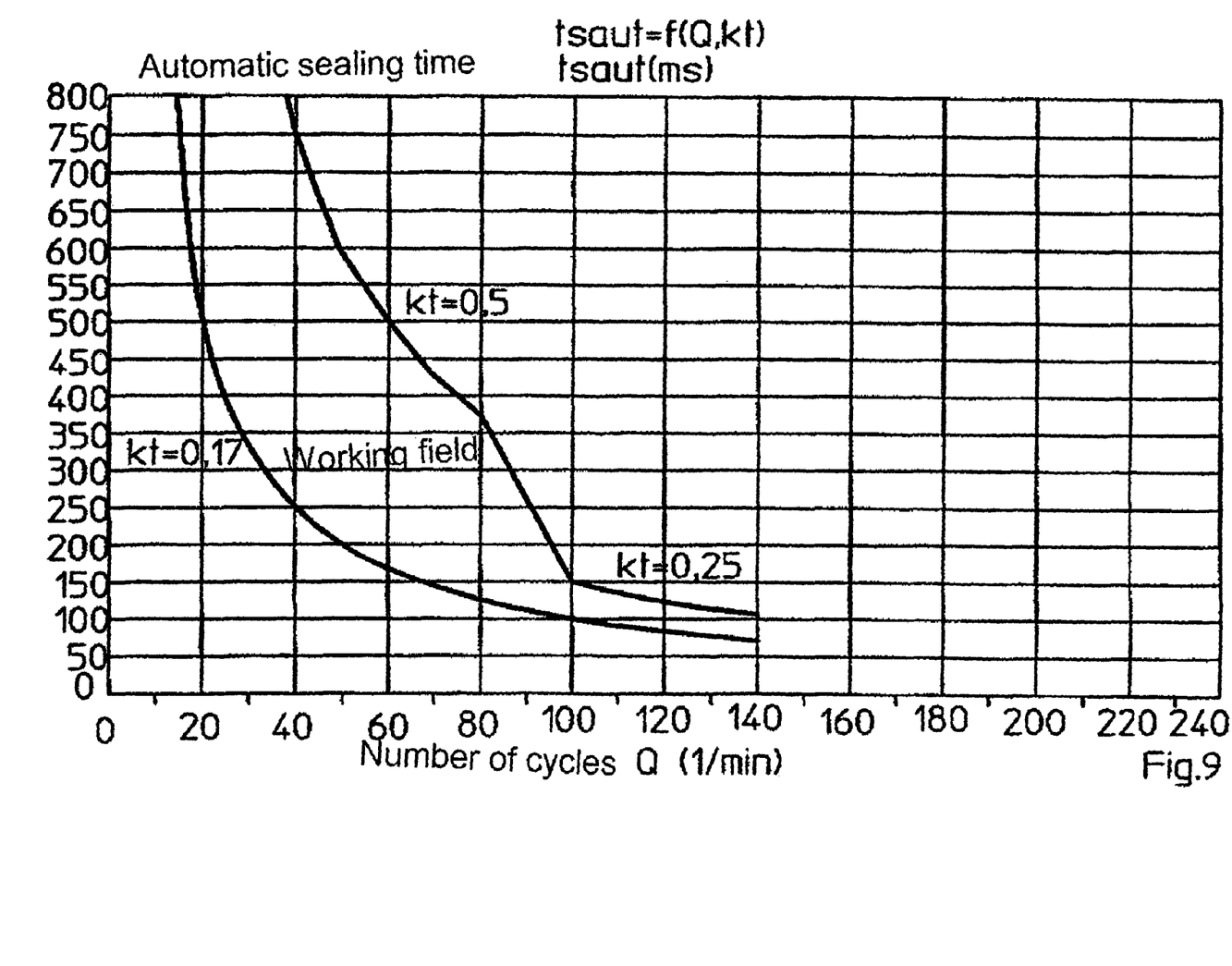
FIG. 9 shows a diagram of a functional relationship analogous to that represented in FIG. 8, but with a different working field for a different vertical tubular bag machine, the working field being delimited between a graph for Kt=0.17, a graph for Kt=0.5 and a graph for Kt=0.25.

The proposed tubular bag machine 3 can be operated within working fields (FIG. 8, FIG. 9), an automatic sealing time tsaut being respectively selectable for a number of cycles Q. In this case, Kt values that can be fixed determine the limits of this working field. In FIG. 8, accordingly, 160 bags per minute can be achieved for Kt=0.5, a maximum of 190 ms (milliseconds) being available for the automatic sealing time. Very long sealing times can be achieved by increasing the Kt value from 0.5 to 0.6. The abrupt increase in sealing time possible as a result allows the automatic sealing time to be increased from 500 to 600 msec, for example for a number of cycles of 60 bags per minute, in order in this way also to be able to weld relatively thick films reliably. The machine type is designed for the production of up to 160 bags per minute.

In the case of another machine type (FIG. 9), a maximum of 140 bags per minute are produced. The working field is delimited by three graphs for Kt=0.17, Kt=0.25 and Kt=0.5. Kt=0.25 corresponds for example to a conventional operating mode. An increase to Kt=0.5 has the effect of achieving much higher sealing times tsaut than were previously known for numbers of cycles of 40 to almost 100 bags per minute. A much longer sealing time tsaut than 800 ms (0.8 sec) is not envisaged in the case of this machine type either.

1 welding jaw
2 transverse sealing station
3 tubular bag machine
4 path
5 straight portion
6 oppositely running welding jaw
7 film tube
8, 9 drive
10 transverse seam
11 cutting device
12 tubular bag
13 cooling air output
14 film web
15 takeoff
16 supply roll
17 shaping shoulder
18 longitudinal sealing device
19 transporting direction
20 filling pipe
21 driving part
22 moving part
23, 24 direction
25 guide
A point of movement
L bag length
Kt=ts/tz sealing time factor
ts sealing time
tz cycle time
Zs sealing path, technical
Zseff effective sealing path

The invention claimed is:

1. Method for moving a welding jaw of a transverse sealing station of a vertical tubular bag machine, comprising the steps of:
   a welding jaw being moved along a closed path, said path having a straight portion, which is provided for the welding jaw to make contact with a film tube to be welded, pressed together between the welding jaw and a second, oppositely running welding jaw,
   the film tube and the welding jaw being moved further at the same speed in the direction of the straight portion, in order to weld the film tube by exposure to the heat of the welding jaw within a sealing time (ts), and
   two electromagnetic linear drives, acting in different directions that are perpendicular to each other and moving the welding jaw, the drives being operated to achieve a circulation of the welding jaw within a cycle time (tz), wherein a sealing time factor (Kt), that can be set as desired for different bag lengths (L), is a value in an open interval between zero and one that describes a time fraction of the sealing time (ts) as a percentage of the cycle time (tz) along an effective sealing path (Zseff), as described by the equation Kt=ts/tz, and wherein the drives are operated in such a way that the sealing time factor (Kt) is maintained.

2. Method according to claim 1, wherein the welding jaw welds said film tube by means of transverse seams, and whereby a tubular bag with a bag length (L) is severed from the film tube by a cutting device.

3. Method according to claim 2, wherein for a given effective sealing path (Zseff), with increasing bag length (L) a decreasing sealing time factor (Kt) is provided.

4. Method according to claim 2, wherein for a given bag length (L) and a given effective sealing path (Zseff), a sealing time factor (Kt) is selected.

5. Method according to claim 1, wherein the effective sealing path (Zseff) is part of a mechanical engineering sealing path (Zs), and wherein the mechanical engineering sealing path (Zs) is made up of a preheating section (Zv) for preheating the film tube or a stripping section for stripping the film tube with the welding jaw at a distance from the film tube, the effective sealing path (Zseff) and a cooling section (Zk) for cooling the film tube with the welding jaw at a distance from the film tube as cooling air is blown onto the film tube from a cooling air outlet provided at the welding jaw.

6. Method according to claim 5, wherein the sealing time (ts) is defined as the time for the mechanical engineering sealing path (Zs).

7. Apparatus in the form of a vertical tubular bag machine, comprising:

a welding jaw configured for movement along a closed path, said path having a straight portion, which is provided for the welding jaw to make contact with a film tube to be welded, pressed together between the welding jaw and a second, oppositely running welding jaw, wherein the film tube and the welding jaw move further at the same speed in the direction of the straight portion, in order to weld the film tube by means of transverse seams by exposure to the heat of the welding jaw within a sealing time (ts);

two electromagnetic linear drives, acting perpendicularly to each other and connected to the welding jaw to achieve a circulation of the welding jaw within a cycle time (tz), such that a sealing time factor (Kt), described by the equation Kt=ts/tz, has a value between zero and one, and is maintained as a constant; and a cutting device for severing a tubular bag with a bag length (L) from the film tube.

8. Apparatus according to claim 7, wherein a driving part of one of said two drives is connected to a moving part of another of said two drives.

9. Apparatus according to claim 7, wherein for a given effective sealing path (Zseff), with increasing bag length (L) a decreasing sealing time factor (Kt) is provided.

10. Apparatus according to claim 7, wherein for a given bag length (L) and a given effective sealing path (Zseff), a sealing time factor (Kt) is selected.

11. Apparatus according to claim 7, wherein the effective sealing path (Zseff) is part of a mechanical engineering sealing path (Zs), and the mechanical engineering sealing path (Zs) is made up of a preheating section (Zv) for preheating the film tube or a stripping section for stripping the film tube with the welding jaw at a distance from the film tube, the effective sealing path (Zseff) and optionally a cooling section (Zk) for cooling the film tube with the welding jaw at a distance from the film tube as cooling air is blown onto the film tube from a cooling air outlet provided at the welding jaw.

12. Apparatus according to claim 11, wherein the sealing time (ts) is defined as the time for the mechanical engineering sealing path (Zs).

\* \* \* \* \*